Sept. 16, 1969  S. G. WINGQUIST  3,466,964
SCREW
Filed March 7, 1967
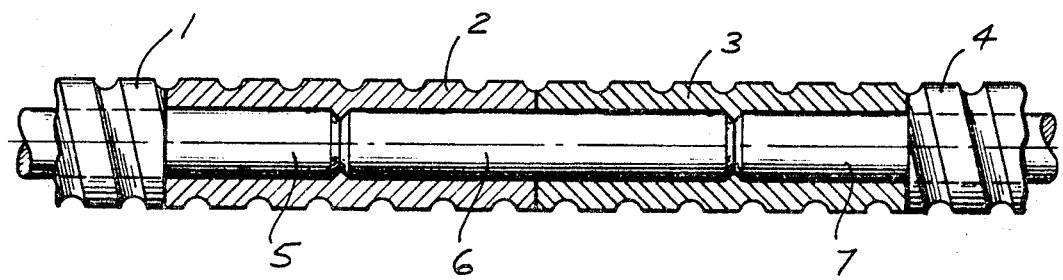
INVENTOR.
STEN GUNNAR WINGQUIST
BY Hane and Nychick
ATTORNEYS 3,466,964
SCREW
Sten Gunnar Wingquist, Trollhattan, Sweden, assignor to Nydqvist & Holm Aktiebolag, Trollhattan, Sweden, a corporation of Sweden
Filed Mar. 7, 1967, Ser. No. 621,314
Claims priority, application Sweden, Mar. 11, 1966, 3,218/66
Int. Cl. F16b 35/00, 33/02
U.S. Cl. 85—1                                    1 Claim

ABSTRACT OF THE DISCLOSURE

The present invention relates to generally cylindrical screws of any desired length which are straight within reasonable tolerances, have a uniform pitch along their entire length and a selected surface hardness. Such screws comprise according to the invention several externally threaded sleeves secured in position on a core bar.

---

The invention relates to general cylindrical screws. More particularly, the invention relates to screws which are straight, have a uniform pitch along the entire length of the threads and a selected substantially uniform surface hardness.

Practical experience shows that it is rather difficult to produce such screws, especially if the screws have a considerable length.

It is a broad object of the present invention to provide a novel and improved screw of the general kind above referred to which is straight within a very narrow range of tolerances, has a uniform pitch and a selected surface hardness and which can be produced with any desired length.

Screws of this type are required in many fields of application. They are particularly important for use as machine tools with numerical control.

The aforepointed out objects, features and advantages and other objects, features and advantages which will be pointed out hereinafter are obtained by providing several externally threaded sleeves and securing the sleeves in fixed abutting positions on a straight core. The sleeves may be made of any suitable and hardenable material such as metal so that any desired surface hardness can be given to the sleeves and the threads formed thereon. The core may be a bar made of any suitable non-hardened material such as soft iron. The core bar may be in one piece or be composed of several sections which are so placed that the joints between adjacent core sections and the joints between adjacent sleeves are lengthwise staggered in reference to each other.

In the single figure of the accompanying drawing a preferred embodiment of a screw according to the invention is shown, partly in section, by way of illustration and not by way of limitation.

The exemplified screw comprises four externally threaded sleeves 1, 2, 3 and 4. The threads are shown as so-called rounded or ball threads but any other type of threads may also be used within the concept of the invention.

After grinding or cutting the threads and hardening the sleeve material to the desired hardness by any conventional technique suitable for the purpose, the four sleeves are joined by fitting the same upon a core bar. While a one piece core bar may be used, a core formed of three sections 5, 6 and 7 is shown. The core sections may be made of any suitable material, preferably soft or non-hardened iron. The lengths of the core sections in reference to the sleeves and the locations of the abutments or joints between adjacent core sections are so selected that they are staggered in reference to the locations of the abutments or joints between the sleeve sections as is clearly shown in the figure.

The sleeves may be secured on the core sections by any suitable means. They may, for instance, be shrunk on the core sections, or the sleeves may be bonded to the core sections by a suitable hardening binder such as polyester based locking agent manufactured by Loctite Corporation, Hartford, Conn., U.S.A.

As is evident, the end of the thread on one sleeve and the beginning of the thread on the next adjacent sleeve should be matched to each other so that a continuous thread along the length of the screw is formed. The correct angular locations of the sleeves in reference to each other during assembly of the screw can be easily effected by means of a nut threaded upon one of the sleeves and bearing a suitable indicating device reaching into the adjacent end of the thread on the next sleeve. Locating means of this kind are well known in the art and do not constitute part of the invention so that a detailed description thereof is not necessary for the understanding of the invention.

A uniform strength of the screw may be readily obtained by producing the screws in accordance with the following equation:

$$L = \frac{d \cdot \sigma}{4 \cdot \tau}$$

in which $L$ = length of sleeves
$d$ = inside diameter of sleeves
$\sigma$ = tensile strength of core material
$\tau$ = shearing strength of the binder or the shrinkage fit.

As is evident, the threaded sleeves can be hardened and subjected to any subsequent machining operations without danger of deformation and the non-hardened or soft iron one-piece core or the core sections can be readily produced with great accuracy without difficulty so that the screw when assembled is straight within a very narrow range of tolerances and also has the selected surface hardness.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore, to cover all such changes and modifications in the appended claim.

I claim:

1. A screw comprising several axially aligned, externally threaded and generally cylindrical sleeves having a selected hardness the screw threads on all said sleeves being of the same pitch and hand; a core bar within said sleeves extending the length thereof, said sleeves being disposed on said core bar in butt engagement with each other; and a layer of an initially flowable and gradually hardening binder between the sleeves and the core bar securing the sleeves to the core bar, said core bar being composed of several sections, the ends of each two adjacent sections abutting against each other, the abutments between each two adjacent core sections and the butt engagements between each two sleeves being lengthwise displaced in reference to each other.

References Cited

UNITED STATES PATENTS

| | | | |
|---|---|---|---|
| 2,475,045 | 7/1949 | Osplack | 74—458 |
| 2,494,846 | 1/1950 | Wedin | 74—458 |
| 2,724,979 | 11/1955 | Cross | 74—458 |

EDWARD C. ALLEN, Primary Examiner

U.S. Cl. X.R.

74—458; 85—46